United States Patent
van der Lely et al.

(10) Patent No.: US 6,367,416 B1
(45) Date of Patent: Apr. 9, 2002

(54) METHOD OF AUTOMATICALLY MILKING ANIMALS AND A FULLY AUTOMATIC MILKING MACHINE PROVIDED WITH A MILKING ROBOT, SAID MILKING MACHINE BEING SUITABLE FOR PERFORMING SAME

(75) Inventors: Olaf van der Lely, Zug (CH); Frans J. A. de Groen, Hellevoetsluis (NL); Ronald M. Pols, Waltham on the Wolds (GB)

(73) Assignee: Maasland NV (NL)

( * ) Notice: Subject to any disclaimer, the term of this patent is extended or adjusted under 35 U.S.C. 154(b) by 0 days.

(21) Appl. No.: 09/419,292

(22) Filed: Oct. 15, 1999

(30) Foreign Application Priority Data

Oct. 15, 1998 (NL) .............................................. 1010323

(51) Int. Cl.⁷ .................................................. A01J 3/00
(52) U.S. Cl. .................................................. 119/14.02
(58) Field of Search ........................... 119/14.02, 14.01, 119/14.03, 14.14, 14.15

(56) References Cited

U.S. PATENT DOCUMENTS

| | | | |
|---|---|---|---|
| 3,783,837 A | | 1/1974 | Olander .......................... 119/8 |
| 4,010,714 A | * | 3/1977 | Notsuki et al. ........... 119/14.03 |
| 4,838,207 A | * | 6/1989 | Bom et al. ................ 119/14.02 |
| 5,195,455 A | * | 3/1993 | Lely et al. ................ 119/14.03 |
| 5,469,808 A | | 11/1995 | Street et al. .................. 119/27 |
| 5,651,329 A | * | 7/1997 | Berg et al. ................ 119/14.02 |
| 5,704,311 A | * | 1/1998 | Berg ......................... 119/14.02 |
| 5,769,023 A | * | 6/1998 | Lely et al. ................ 119/14.02 |
| 5,865,138 A | * | 2/1999 | Lely .......................... 119/14.02 |
| 5,878,692 A | * | 3/1999 | Ornerfors ................. 119/14.08 |
| 6,019,061 A | * | 2/2000 | Schulte .................... 119/14.03 |
| 6,062,164 A | * | 5/2000 | Oosterling ................ 119/14.02 |
| 6,167,839 B1 | * | 1/2001 | Isaksson et al. ......... 119/14.08 |

FOREIGN PATENT DOCUMENTS

| | | |
|---|---|---|
| NL | PCT/NL95/00207 | 6/1995 |
| NL | 0728413 A1 | 8/1996 |
| NL | 0792579 A2 | 9/1997 |
| SE | 0091892 | 10/1993 |
| SE | PCT/SE95/01569 | 12/1995 |
| SE | PCT/SE96/01222 | 9/1996 |

* cited by examiner

*Primary Examiner*—Peter M. Poon
*Assistant Examiner*—Judith A. Nelson
(74) *Attorney, Agent, or Firm*—Penrose Lucas Albright

(57) ABSTRACT

A method of training animals that are milked in a fully automated milking system wherein they enter a milking parlor at their own volition, not to enter the milking parlor too soon after the previous milking by causing the animal that does so to experience unpleasant procedures. The circumstance that the animal is visiting a milking parlor too soon after its last visit is sensed by the milk flow from at least one of the teats or because the automatic milking machine is unable to connect the teat cups to the animal's teats. In the latter event, the animal is immediately caused to depart from the milking parlor. In the former event, either the teat cups are immediately disconnected and the animal is caused to depart or the animal is milked for a prolonged period of time which is less than pleasant to the animal and then caused to depart. The prolonged milking may be coincident with alteration of the milk vacuum level. On the other hand, the milking parlor includes many attractions such as feed and drink to entice the animal to enter the milking compartment. The unpleasant procedures which occur when the animal enters the milking parlor too soon after a previous milking teaches it to space its entries into the milking parlor to when it needs to be milked.

14 Claims, No Drawings

US 6,367,416 B1

METHOD OF AUTOMATICALLY MILKING ANIMALS AND A FULLY AUTOMATIC MILKING MACHINE PROVIDED WITH A MILKING ROBOT, SAID MILKING MACHINE BEING SUITABLE FOR PERFORMING SAME

FIELD OF THE INVENTION

The invention relates to a method of automatically milking animals, such as cows, by robotic means wherein the animals enter the milking parlor to be milked based on their own volition. The invention further relates to a method for controlling spontaneously for each animal the intervals between successive milkings.

BACKGROUND OF THE INVENTION

Methods for controlling when animals will be accepted in a milking parlor for milking are generally known. When, in the course of such a method, an animal wishes to visit the milking parlor, it is decided on the basis of an admittance criterion (for admitting the animal to the milking parlor) or a milking criterion (for connecting the teat cups of the milking robot to the animal's udder) or both whether or not the animal should be milked. When either criterion is not met, the animal is not admitted to the milking parlor or is removed therefrom as appropriate.

European Patent EP-A-0 091 892 discloses a system in which a cow is only milked in the milking parlor after a previously determined period of time has elapsed since her last milking. From the International Patent WO-A-95/35028 it is known to use as a milking criterion the number of milkings of other animals since the previous milking of the relevant animal; the animal is only milked when this number at least equals a specific minimum number which may vary from animal to animal. When the milking criterion is not met, the animal is caused to depart from the milking parlor. In other known systems each animal is checked at the entrance of the milking parlor to determine whether or not it was milked at a too recent point of time. The animal is then only admitted to the milking parlor when the applicable admittance criterion has been met.

The above methods have various disadvantages. Animals that, for any reason whatsoever, may wish to visit the milking parlor too often, but thereafter are not admitted to the milking parlor or are quickly caused to leave the milking parlor, may become frustrated. Moreover, when applying each criterion, not only is an animal identification system necessary, but also a system of recording data relevant to the criterion (such as, for example, for each animal the point of time at which the last milking took place) is required.

SUMMARY OF THE INVENTION

An object of the invention is to provide an improved method which will result in the animals being milked at appropriate intervals. According to the invention, this is achieved by processing each animal that enters a milking parlor in the same manner as usual which usually includes the cleaning and massaging of the animal's udder and teats followed by connecting the teat cups to the animal's teats. However, when a flow meter indicates that the animal has been milked recently, the process thereof is intentionally made disagreeable by actions such as continuing the milking longer than usual or altering the vacuum level at the animal's teat. This is balanced by making the milking parlor otherwise an attractive place for the animal to visit by a number of means such as dispensing food and drink therein. But the unpleasantness of the milking process when the animals attempt to visit the milking parlor too often soon trains the animal to visit the milking parlor only when it is ready to be milked.

DETAILED DESCRIPTION OF THE PREFERRED EMBODIMENTS OF THE INVENTION

The invention is based on the insight that if each time an animal is cleaned or massaged or subjected to connection of the teat cups of the milking robot to its udder, or any combinations thereof, it experiences to an increasing extent unpleasant occurrences due to visiting the milking parlor too often, and, in the long run, it will change its behavior and visit the milking parlor less frequently. Contrary to the opinion, prevailing among the experts and generally accepted, that, when a milking robot is used, it is absolutely necessary to prevent the animals, with the aid of a selected criterion, from being milked too frequently, it is to be observed that specifically frequent and unlimited admission of animals to the milking parlor, for cleaning or massaging or milking or any combination thereof, leads to excellent results. The experience exerted by the milking robot on the animals that attempt to be milked too often dampens the animals' desires to enter the milking parlor until they are, in fact, ready to be milked. In this way an equilibrium is attained after some time in which the number of an animal's visits to the milking parlor in a given period is reduced.

By making a visit to the milking parlor unpleasant when that visit is too soon after the last milking, it is no longer necessary to control the admittance to the milking parlor by means of a selected admittance criterion or to control milking or non-milking of an animal by means of a milking criterion. The choice of visiting the milking parlor and being milked lies completely with the animals, which renders the method highly animal-friendly. In the long run, the animals will not visit the milking parlor too often of their free will. Furthermore, it is no longer necessary (although it may be desirable for other purposes) to provide an animal identification system and a system of recording animal data in connection with selected admittance or milking criterion.

When an animal (a cow, for example) visits the milking parlor, it will be admitted at all times, unless, of course, the milking robot is already occupied by another animal or is in a cleaning or maintenance phase. Then, there is effected a cleaning of the animal's udder or a massage to stimulate the animal's udder or an attempt to connect the teat cups of the milking robot to the animal's teats and, if successful, to milk the animal in a manner not pleasant to the animal. After cleaning or massaging or so milking the animal, or any combination thereof, or after a specific number of unsuccessful attempts to connect the teat cups of the milking robot to the animal's udder, the door of the milking parlor is opened, so that the animal can leave the milking parlor or (if necessary) the animal is caused to depart from the milking parlor in a known manner.

On the other hand, the animals are preferably attracted to the milking parlor by at least one means to effect the attraction. For example, food or drink or both may constitute an attraction means. In this situation, at each visit of an animal to the milking parlor, a measured amount of food or drink or both are supplied to the animal. It is also possible to use an aromatic substance which is pleasant or attractive to the relevant animals, such as cows. Further, it is possible to use visual or acoustic means or both (light, colors, pictures, pleasant sounds, music, etc.). The design of the milking parlor (a resilient mat, an elevation for the forelegs, etc.) may also serve as an attraction. The use of one or more attraction means has the advantage of additionally ensuring that the animals will visit the milking parlor sufficiently often, in spite of the fact that when the animals are in said milking parlor cleaning, massaging or both are effected and teat cups of the milking robot are connected to their udders.

Also if an animal has just been milked and returns to the milking robot too quickly, after the teat cups are connected to the teats, the milk flow of one or more teats is measured with the aid of one or more milk flow sensors. If the milk flow is below a predetermined threshold (which may be adjustable), the relevant teat cup or cups are disconnected immediately or are only disconnected after a possibly adjustable period of time. Especially in the situation of animals that return to the robot too quickly, milking may be continued somewhat longer than usual in order to discourage them from returning to the milking parlor too quickly after their prior milkings. Further, the milk vacuum level may be altered to discourage the animals who return to the milking parlor too early even more.

The fully automatic milking machine provided with a milking robot according to the invention admits any animal to the milking parlor at any point of time, provided, of course, that the milking parlor is ready for milking an animal (i.e., is not already occupied or is not in a cleaning or maintenance phase). At each visit of an animal to the milking parlor the milking robot cleans or massages the animal's udder or teats or both and attempts to connect the teat cups to the animal's teats and to milk the animal in a manner which is less than pleasant to the animal.

Although we have described the preferred embodiments of our invention, it is to be understood that the invention is capable of other adaptations and modifications within the scope of the following claims:

What is claimed is:

1. A method of automatically milking animals that are able to move freely in an area intended therefor and to visit individually a milking parlor having a fully automatic milking machine provided with a milking robot, the method comprising admitting any animal into the milking parlor at any point of time when the milking parlor is ready for milking an animal irrespective of whether or not the animal so admitted is being admitted too early after its previous milking, ascertaining that an animal so admitted has been admitted too early after its last milking by the characteristics of its milk flow and causing the stay of such animal in the milking parlor to be a sufficiently unpleasant experience so as to discourage such animal from visiting the milking parlor in the future too soon after such animal's previous milking.

2. A method in accordance with claim 1, which comprises providing an attraction in the milking parlor to entice said animals to enter said milking parlor.

3. A method in accordance with claim 1, which comprises enticing said animals to enter said milking parlor by providing therein feed for the animals.

4. A method in accordance with claim 1, which comprises providing allurement means to entice visits of said animals into said milking parlor, said allurement means comprising a liquid for the animals to drink while in said milking parlor.

5. A method in accordance with claim 1, which comprises providing allurement means to entice visits by said animals into said milking parlor, said allurement means comprising an aromatic substance.

6. A method in accordance with claim 1, which comprises providing allurement means which is associated with said milking parlor to entice said animals to visit said milking parlor, said allurement means comprising visual means which are attractive to said animals.

7. A method in accordance with claim 1, which comprises providing allurement to entice said animals to visit said milking parlor, said allurement means comprising acoustic means which are attractive to said animals.

8. A method in accordance with claim 1, which comprises designing said milking parlor so that it is attractive to said animals by providing a resilient mat which supports said animals when they are in said milking parlor.

9. A method in accordance with claim 1, comprising designing said milking parlor so that it is comfortable and pleasant for said animals when they individually visit said milking parlor by providing an elevation for the forelegs of said animals when in said milking parlor.

10. A method in accordance with claim 1, comprising providing said milking parlor with allurement means which consists of one or more of the following: feed for an animal in said milking parlor, drink for an animal in said milking parlor, an aromatic substance that attracts said animals to enter and be in said milking parlor, visual means associated with said milking parlor which attracts said animals to enter and be in said milking parlor, acoustic means associated with said milking parlor which attracts said animals to enter and be in said milking parlor, a resilient mat which supports said animals when in said milking parlor, and an elevation for the forelegs of said animals in said milking parlor.

11. A method of automatically milking animals that are able to move freely in an area intended therefor and to visit individually a milking parlor having a fully automated milking machine provided with a milking robot, the method comprising cleaning and massaging the animal's udder, attempting for a predetermined number of tries to connect teat cups of the milking robot to the animal's udder and after said predetermined number of said tries prove unsuccessful, causing the animal to depart from said milking parlor.

12. A method of automatically milking animals that are able to move freely in an area intended therefor and to visit individually a milking parlor having a fully automated milking machine including a milking robot, the method comprising connecting teat cups from the milking machine to the teats of the animal in the milking parlor, measuring milk flow from at least one of the animal's teats by a flow sensor, comparing said milk flow with a threshold value of milk flow and selectively if said milk flow is above said threshold value continuing to milk said animal or, if said milk flow below said threshold value, disconnecting said teat cups from said animal's teats after a period of time which is less than pleasant to said animal, and causing said animal to depart from said milking parlor.

13. A method in accordance with claim 12 which comprises the additional step of altering the milk vacuum level to which said teats of said animal are exposed while the teat cups are connected to said animal's teats.

14. A method of automatically milking animals that are able to move freely in an area intended therefor and to visit individually a milking parlor having a fully automated milking machine including a milking robot, the method comprising connecting said teat cups from the milking machine to the teats of the animal in the milking parlor, measuring the milk flow from at least one of the animal's teats by a flow sensor, comparing said milk flow with a threshold value of milk flow and selectively if said milk flow is above said threshold value continuing to milk said animal or, if said milk flow is below said threshold value, altering the vacuum level to which the teats of said animal are exposed while the teat cups are connected to said animal's teats and continuing to milk said animal while the teats of said animal are exposed to said altered milk value vacuum level for a period of time, disconnecting said teat cups from said animal's teats and causing said animal to depart from said milking parlor.

* * * * *